United States Patent Office 3,506,727
Patented Apr. 14, 1970

3,506,727
PROCESS FOR FABRICATING MIXTURES
CONTAINING VINYL CHLORIDE AND
1,2-DICHLOROETHANE
Julien Mulders, Brussels, Belgium, assignor to
Solvay & Cie, Brussels, Belgium
Filed May 8, 1967, Ser. No. 636,713
Int. Cl. C07c *21/06, 17/02*
U.S. Cl. 260—656                               7 Claims

ABSTRACT OF THE DISCLOSURE

Process for the production of mixtures containing vinyl chloride and 1,2-dichloroethane by means of a reaction between a reactive gaseous mixture, composed of acetylene, hydrogen chloride, ethylene, and chlorine, the chlorine-ethylene molar ratio being between 0.9 and 1.5, and inert gaseous compounds acting as diluents and present in the mixture in a proportion of at least 40% by volume, at a temperature of between 100° C. and 180° C., in the presence of a hydrochlorination catalyst based on metallic chloride, the concentration of active metallic elements of the catalyst being less than 5% by weight.

BACKGROUND OF THE INVENTION

The present invention relates to the production of vinyl chloride and 1,2-dichloroethane, and particularly to a process for manufacturing these compounds from a mixture of acetylene, ethylene, chlorine and hydrogen chloride.

It is known that it is possible to obtain vinyl chloride from diluted mixtures of acetylene and ethylene by successively converting the acetylene into vinyl chloride and the ethylene into 1,2-dichloroethane, without it being necessary to separate the acetylene and the ethylene from the other ingredients of the initial mixture, such as hydrogen, methane and oxides of carbon.

This process is carried out in the following four successive steps:

(1) The selective hydrochlorination of the acetylene contained in the mixture by a reaction which can be expressed by the following equation:

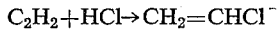

$$C_2H_2 + HCl \rightarrow CH_2 = CHCl$$

(2) The separation of the vinyl chloride formed during Step 1 from the gaseous mixture containing the diluted ethylene which has not reacted.

(3) The chlorination of the diluted ethylene obtained by Step 2 in such a manner as to obtain 1,2-dichloroethane according to a reaction which can be expressed according to the following equation:

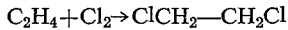

$$C_2H_4 + Cl_2 \rightarrow ClCH_2\text{---}CH_2Cl$$

(4) The thermal dehydrochlorination of the 1,2-dichloroethane obtained by Step 3 so as to form vinyl chloride and hydrogen chloride, the latter then being returned to the process of Step 1.

The processes which combine the four steps set forth above, such as those described in French Patent No. 1,295,387, already represent a substantial improvement over the previous techniques in that they result in commercially acceptable yields of vinyl chloride without requiring the separation of the acetylene and then the ethylene from the other ingredients of the gaseous mixture resulting, for example, from the cracking of hydrocarbons. However, these processes have not been widely exploited in industry primarily due to the high installation costs necessitated particularly by the successive hydrochlorination and chorination operation which must be performed, and by the requirement for separating the vinyl chloride formed during Step 1 before introducing the nonconverted gases at the chlorination stage of Step 3.

This supplemental step involving the separation of the vinyl chloride at the outlet of the stage for hydrochlorinating the cracking gases containing acetylene and ethylene has to date always been considered necessary. The specification of U.S. Patent No. 2,858,347 particularly points out the desirability of separating the vinyl chloride after the hydrochlorination step in order to prevent its polymerization if it should appear in the residual gaseous mixture submitted to the subsequent action of the chlorine. Similarly, in the known successive hydrochlorination and chlorination processes it is recognized that it is necessary to separate the vinyl chloride before passing to the chlorination stage in order to prevent the secondary formation of 1,1,2-trichloroethane.

SUMMARY OF THE INVENTION

It is a primary object of the present invention to eliminate these shortcomings of the known processes.

Another object of the present invention is to eliminate the need for carrying out successive hydrochlorination and chlorination operations in processes of the above-described type.

Yet another object of the present invention is to substantially simplify the production of vinyl chloride and 1,2-dichlorethane.

The present invention is based on applicant's surprising discovery that it is possible to achieve an efficient conversion of mixtures containing acetylene and ethylene into mixtures containing vinyl chloride and 1,2-dichloroethane without it being necessary to carry out successive hydrochlorination and chlorination reactions such as have until now been considered to be indispensable.

These and other objects according to the present invention are achieved by a novel process for producing a mixture containing vinyl chloride and 1,2-dichloroethane. The novel process is carried out by bringing a reactive gaseous mixture of acetylene, hydrogen chloride, ethylene, chlorine, and inert gaseous ingredients, in which the molar ratio of chlorine to ethylene is between about 0.9 to 1.05, and the inert ingredients serve as diluents and constitute at least 40%, by volume, of the mixture, into the presence of a hydrochlorination catalyst having a base of metallic chloride and having a concentration of active metallic elements which is less than 5% by weight. The process further includes subjecting such mixture to a reaction temperature between about 100° C. and 180° C. for inducing a reaction in which vinyl chloride and 1,2-dichloroethane are produced.

DESCRIPTION OF THE PREFERRED EMBODIMENTS

Figure 1:
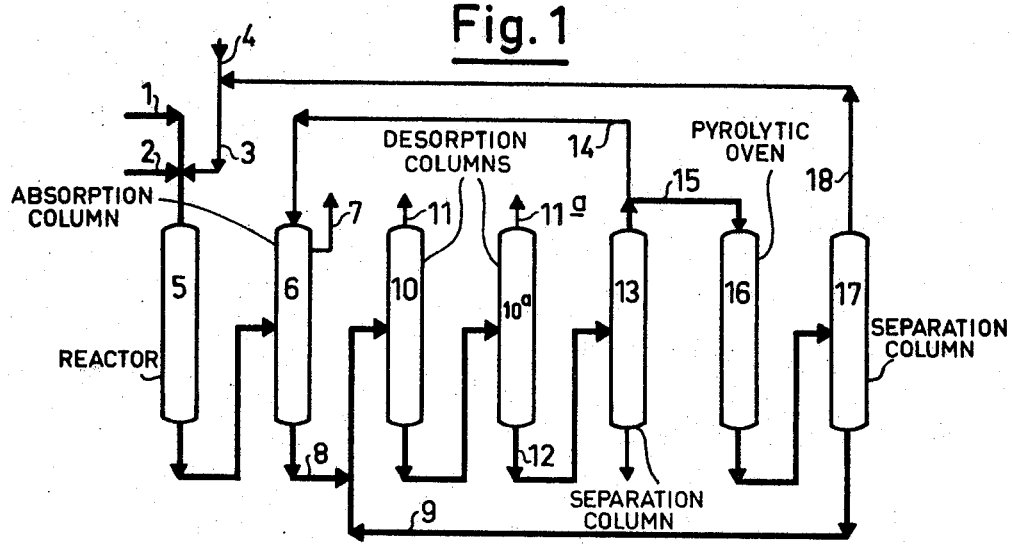
FIGURE 1 is a block diagram showing one arrangement for carrying out the present invention.

The process according to the present invention for producing mixtures containing vinyl chloride and 1,2-dichloroethane consists in inducing a reaction in a reactive gaseous mixture composed of acetylene, hydrogen chloride, ethylene, and chlorine, the chlorine-ethylene molar ratio being between about 0.9 and 1.05, in the presence of inert gaseous components acting as diluents and present in the mixture in a concentration of less than about 40%, by volume, at a temperature of between about 100° C. and 180° C., in the presence of a hydrochlorination catalyst having a metallic chloride base, the concentration of the active metallic element, or elements, of the catalyst being less than about 5% by weight.

By varying the reaction conditions within the limits set forth above, it is possible to obtain a total conversion of acetylene into vinyl chloride and of ethylene into 1,2-dichloroethane which is markedly greater than 90%.

The catalytic system can be constituted by a known support such as, silica, alumina, or activated charcoal impregnated with one or several compounds of such metals as mercury, bismuth, sodium, potassium, silver, barium, strontium, calcium, magnesium, zinc, cadmium, copper, aluminum, chromium, antimony, silicon, vanadium, iron, or cerium.

Supports having a silica base are particularly suitable. For a given type of support, particularly activated charcoal or silica, the quantity of active impregnating elements used exerts a marked influence on the vinyl chloride yield as well as on the 1,2-dichloroethane yield. In the case of mercuric chloride, for example, it is noted that, surprisingly, at a temperature of 125° C., the vinyl chloride and 1,2-dichloroethane yield rates increase when the percentage of mercury in the catalyst is reduced below 5%, by weight. Specifically, good results have been obtained with catalysts containing around 2% by weight of mercury in the form of $HgCl_2$.

The temperature can be maintained between about 100° C. and 180° C., but for a given concentration of the active element of the catalyst, the vinyl chloride and 1,2-dichloroethane yield rates increase as the temperature is decreased within this range. However, as a practical matter it is not desirable to decrease the temperature below 100° C. because at this temperature the rate of conversion of ethylene and acetylene already begins to diminish, as is shown in Example 5 of the examples set forth below. Above 180° C., the risk of sublimation of the metallic chloride becomes too great. It is therefore preferable to operate in a temperature range of 120–130° C. when a catalyst containing around 2% by weight of mercury, in particular, is used.

Although good yields are obtained when the operations are carried out at atmospheric pressure, it is preferable to maintain a pressure greater than atmospheric in the reactor because this results in a marked increase in the resulting conversion rates.

The diluting agents can accompany the hydrocarbons to be treated. This is particularly desirable when use is made of acetylene and ethylene mixtures resulting from the acetylenic cracking of hydrocarbons such as ethane, propane, butane, or even petroleum fractions such as light naphtha. After the usual separation of the carbon and the tars, and possibly of the carbonic gas, the resulting gaseous mixture can be treated in such manner as to eliminate the higher acetylene derivatives and the hydrocarbons whose molecules contain more than three carbon atoms. The refining of the higher unsaturated hydrocarbons could be carried out, for example, by selective hydrogenation or prechlorination. The resulting gaseous mixture would then contain a 20% to 30% concentration of a mixture of ethylene and acetylene diluted by residual gases such as hydrogen, methane, and carbon oxides and it is this gaseous mixture which is utilized as one of the starting materials of the process according to the present invention.

The diluting agent could also be introduced with the chlorine. Thus, it would be possible to utilize diluted chlorine produced by the Deacon process, provided there is available a mixture which is sufficiently rich in acetylene and ethylene. Generally, it is preferred that the diluting agents be present in the reactive gaseous mixture in a proportion of at least 40% by volume. This requirement is readily satisfied when use is made of a cracking gas containing 15% to 30% of a mixture of ethylene and acetylene. These concentrations correspond, respectively, to 74% and 54% inert components in the starting reactive mixture. In addition, it is preferable to maintain the chlorine-ethylene molar ratio between 0.9 and 1.05 in order to limit the additive secondary chlorination reactions.

It is advantageous to utilize the hydrogen chloride resulting from the subsequent dissociation of the 1,2-dichloroethane, completed as needed by a supplemental supply of the hydrogen chloride byproduct of other dehydrochlorination or substitutive organic chlorination reactions.

According to the invention, the hydrogen chloride and the chlorine are introduced together with the hydrocarbons and the diluting gases at the inlet of the reaction zone.

The simultaneous hydrochlorination and chlorination reactions occur in a selective manner when the process is carried out with a catalytic system disposed on a fixed bed.

The resulting mixture of vinyl chloride and 1,2-dichloroethane can be utilized in the form produced, possibly in order to undergo a subsequent conversion, but it is particularly well suited for the obtaining of vinyl chloride.

In order to demonstrate the effectiveness of the process according to the present invention, seven specific examples will be presented below relating to tests involving the simultaneous chlorination and hydrochlorination of diluted gaseous mixtures containing chlorine, hydrogen chloride, actylene and ethylene. An eighth example will be given, for purposes of comparison, of a process which lies outside of the scope of the present invention. These examples provide a clear indication of the influence of the temperature, pressure, and composition of the catalyst on the results produced.

The conditions created and ingredients employed in the eight examples are set forth in the table presented below. Each of these processes was carried out with one of four different catalytic compositions each produced by the impregnation of $HgCl_2$, starting with an aqueous solution, on silica or activated charcoal, and by drying at 120–150° C. for 72 hours. The resulting catalytic compositions were as follows:

Catalyst I—Silica impregnated with around 2% by weight of mercury.

Catalyst II—Silica impregnated with around 3% by weight of mercury.

Catalyst III—Activated charcoal impregnated with 5% by weight of mercury.

Catalyst IV—Activated charcoal impregnated with around 2% by weight of mercury.

Each of these catalytic masses was disposed successively in a vertical reactor constituted by a steel tube having an interior diameter of 51 millimeters and a length of 1.445 meters and surrounded by a double envelope for the circulation of a mass of oil whose temperature is thermostatically controlled. An assembly of thermocouples placed in an axial sheath having an exterior diameter of 14 millimeters permits the temperature at various levels of the reactor to be measured.

The flow rates as well as the respective proportions of the reactive materials and the inert diluents given in the following table correspond to a contact time of 140 seconds. The quantity of inert diluents represents around 60% of the volume of the reactive mixture. The other conditions for the seven examples according to the present invention, as well as the results derived by chromatographic analysis of the outflowing products, also appear on the table.

Example 8, which relates to a process beyond the limits of the present invention, was carried out with the aid of a catalyst containing 5% by weight of mercury.

In the column listing the ingredients of the reactive gaseous mixtures introduced, ingredient A is a diluted mixture containing 12% $C_2H_2$ and 12% $C_2H_4$, and ingredient B is a mixture of chlorine diluted with 86% of inert gases.

TABLE

| Test No. | Catalyst | Temp., °C | Pressure, kg./cm.² | Flow rates of ingredients of reactive gaseous mixture introduced, l./h. at STP | Molar rate of C₂H₂ transformation, percent | Molar rate of C₂H₄ transformation, percent | Vinyl chloride yield in proportion to the amount of C₂H₂ introduced, percent | 1,2-dichloroethane yield in proportion to the amount of C₂H₄ introduced, percent | Total vinyl chloride and 1,2-dichloroethane yield in proportion to the total amount of C₂ introduced, percent |
|---|---|---|---|---|---|---|---|---|---|
| 1 | I | 125 | 1 | HCl=4.5, Cl₂=4.5, A=37.5. | 100 | 96 | 94 | 95 | 94.5 |
| 2 | II | 125 | 1 | Same as Test 1 | 100 | 87 | 84 | 86 | 85 |
| 3 | IV | 125 | 1 | ___do___ | 100 | 85 | 88 | 84 | 86 |
| 4 | IV | 175 | 1 | HCl=4, Cl₂=4, A=32.2. | 100 | 85 | 73 | 85 | 79 |
| 5 | I | 100 | 1 | Same as Test 1 | 83 | 90 | 77 | 89 | 83 |
| 6 | I | 125 | 4 | HCl=18, Cl₂=18, A=150. | 100 | 99 | 98 | 97.5 | 98 |
| 7 | I | 125 | 1 | HCl=4.5, B=33.4, C₂H₄=4.5, C₂H₂=4.5. | 100 | 96 | 94 | 96 | 95 |
| 8 | III | 125 | 1 | Same as Test 1 | 100 | 80 | 73 | 65 | 69 |

It may be noted that in the majority of cases the acetylene is completely converted and even when the process is carried out under a pressure of one atmosphere, the total vinyl chloride and 1,2-dichloroethane yield in proportion to the total amount of C₂ introduced exceeds 94% in the process of Example No. 1. In addition, Examples No. 1, 2 and 7 clearly show the advantage of silica-based catalysts over activated charcoal-based catalysts.

Referring now to the drawings, there are shown two systems for carrying out processes according to the present invention for obtaining vinyl chloride as a final product.

In the arrangement shown in FIGURE 1, diluted gas containing acetylene and ethylene is introduced through line 1, chlorine is introduced via line 2 and HCl is introduced via line 3. A possible auxiliary supply of HCl is introduced via line 4. All of these ingredients are fed into the reactor 5 in which is disposed a suitable bed supporting the catalyst. Out of the reactor 5 flows a gaseous product containing primarily vinyl chloride, 1,2 - dichloroethane and the inert gases.

This gaseous product is fed into absorption column 6 where the inert gases are separated and led off via line 7, while a liquid phase having a base of 1,2-dichloroethane and vinyl chloride is created by absorption in 1,2-dichloroethane delivered from separation column 13 by way of line 14. This liquid phase leaves adsorption column 6 via line 8.

The mixture in line 8 is received by the conduit 9 conducting vinyl chloride and 1,2-dichloroethane from the base of separation column 17. The mixture in conduit 9 is fed to a desorption column 10 in which the vinyl chloride is desorbed and led off via line 11 while the remaining products are fed to a second desorption column 10a in which the lighter products are desorbed and led off via line 11a.

The remaining products flow to the base of column 10a where they are fed off via line 12 to separation column 13. In this column 1,2-dichloroethane is separated from the heavier residual products, the separated 1,2-dichloroethane exiting at the top of column 13, with one portion thereof being led via conduit 14 to the adsorption column 6 and the other portion thereof being fed via line 15 to a pyrolytic oven 16 where it undergoes a pyrolysis treatment. The heavier residual products remaining in colmun 13 are fed off via the base thereof.

The treated material flowing out of oven 16 is fed to separation column 17 in which hydrogen chloride is separated from the vinyl chloride and the 1,2-dichloroethane. The hydrogen chloride exits from the top of separation column 17 and is fed via line 18 to line 3, while the vinyl chloride and 1,2-dichloroethane exit via the base of the column 17 and are fed through line 9 to the input of the vinyl chloride desorption column 10.

Reactor 5 may be of the type described in detail above in connection with the specific examples of processes according to the present invention. The remaining devices shown in FIGURE 1 can all be constituted by well-known, commercially available processing units.

Figure 2:
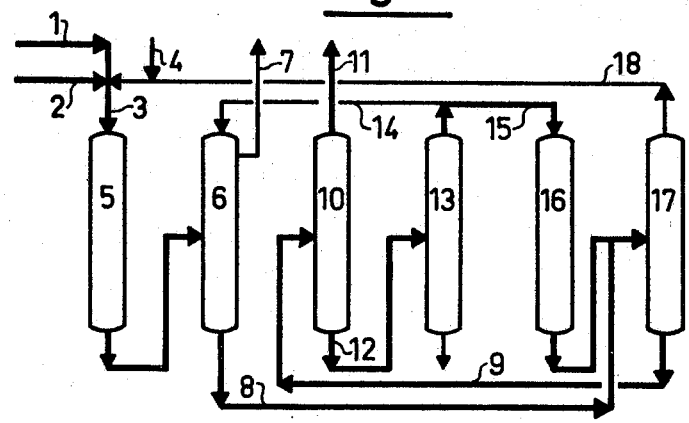
FIGURE 2 is a view similar to that of FIGURE 1 of a modified arrangement for carrying out the present invention.

FIGURE 2 shows a modified version of an arrangement for carrying out the processes according to the present invention which differs from that of FIGURE 1 only in that the organic products appearing at the base of absorption column 6 are fed to the separation column 17 together with the output from the pyrolytic oven 16 so as to cause the vinyl chloride desorption column 10 to receive its input from but a single source.

In carrying out the process according to the present invention, i.e., in directly forming a mixture of vinyl chloride and 1,2-dichloroethane, the absorption of the reaction products requires the supply of a smaller quantity of liquid 1,2-dichloroethane than that required in previous processes because this compound is already present in the reaction products and, as it condenses, participates in the absorption of the vinyl chloride.

It will be understood that the above description of the present invention is susceptible to various modifications, changes, and adaptations, and the same are intended to be comprehended within the meaning and range of equivalents of the appended claims.

I claim:

1. A process for producing a mixture containing vinyl chloride and 1,2-dichloroethane comprising the steps of: bringing a reactive gaseous mixture containing acetylene, hydrogen chloride, ethylene, chlorine and inert gaseous ingredients, in which the molar ratio of chlorine to ethylene is between about 0.9 and 1.05 and the inert ingredients serve as diluents and constitute at least 40%, by volume, of the mixture, into the presence of a hydrochlorination catalyst constituted by a support impregnated with mercuric chloride and having a concentration of active metallic elements which is less than 5% by weight; and subjecting such mixture to a reaction temperature of between about 100° C. and 180° C. for inducing a reaction in which vinyl chloride and 1,2-dichloroethane are produced.

2. A process as defined in claim 1 wherein the concentration of mercury in the catalyst is around 2% by weight.

3. A process as defined in claim 1 wherein the catalyst support is of silica.

4. A process as defined in claim 1 wherein the reaction temperature is between about 120° C. and 130° C.

5. A process as defined in claim 1 wherein the catalyst is disposed on a fixed bed.

6. A process as defined in claim 1 wherein the ethylene and acetylene are introduced together with at least a portion of the inert gaseous ingredients.

7. A process as defined in claim 1 wherein the ethylene and acetylene of the gaseous mixture are derived in diluted form from a hydrocarbon cracking process.

References Cited

UNITED STATES PATENTS 2,520,712  8/1948  Cheney _____ 260—662 X

FOREIGN PATENTS 603,099  6/1948  Great Britain.
977,578  12/1964  Great Britain.

LEON ZITVER, Primary Examiner

J. A. BOSKA, Assistant Examiner

U.S. Cl. X.R.

260—662

UNITED STATES PATENT OFFICE
CERTIFICATE OF CORRECTION

Patent No. 3,506,727　　　　　　　　　　　　　　April 14, 1970

Julien Mulders

It is certified that error appears in the above identified patent and that said Letters Patent are hereby corrected as shown below:

Column 1, after line 7, insert -- Claims priority, application France, May 20, 1966, 62,312 --; line 17, "1.5" should read -- 1.05 --; line 71, "chorination" should read -- chlorination --. Column 2, line 28, "dichlorethane" should read -- dichloroethane --; line 43, "to" should read -- and --. Column 5, line 50, "adsorption" should read -- absorption --.

Signed and sealed this 29th day of September 1970.

(SEAL)
Attest:

Edward M. Fletcher, Jr.
Attesting Officer

WILLIAM E. SCHUYLER, JR,
Commissioner of Patents